(12) United States Patent
Hayashi et al.

(10) Patent No.: US 10,737,333 B2
(45) Date of Patent: Aug. 11, 2020

(54) MACHINE TOOL

(71) Applicant: OKUMA Corporation, Niwa-gun, Aichi (JP)

(72) Inventors: Tomoki Hayashi, Aichi (JP); Shoichi Morimura, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 0 days.

(21) Appl. No.: 16/255,143

(22) Filed: Jan. 23, 2019

(65) Prior Publication Data

US 2019/0232387 A1    Aug. 1, 2019

(30) Foreign Application Priority Data

Jan. 26, 2018   (JP) ................................ 2018-012003

(51) Int. Cl.
*B23B 29/34*      (2006.01)
*B23Q 3/155*     (2006.01)
(Continued)

(52) U.S. Cl.
CPC ............ *B23B 29/242* (2013.01); *B23B 3/162* (2013.01); *B23B 29/20* (2013.01); *B23B 31/40* (2013.01); *B23B 31/42* (2013.01); *B23Q 3/15513* (2013.01); *B23Q 3/15553* (2013.01); *B23Q 7/046* (2013.01); *B25J 15/04* (2013.01); *B23Q 2003/15586* (2013.01);
(Continued)

(58) Field of Classification Search
CPC ......... Y10T 483/1719; Y10T 483/1721; Y10T 29/5114; Y10T 29/5109; B25J 15/0066; B25J 15/0057; B25J 15/0061; B23Q 7/04; B23Q 2003/15586; B23Q 3/1554
See application file for complete search history.

(56) References Cited

U.S. PATENT DOCUMENTS 2,315,393 A * 3/1943 Bowerman ............ B23Q 3/101
                                                                                82/152
4,404,727 A * 9/1983 Zankl ................. B23Q 3/15513
                                                                              483/14

(Continued)

FOREIGN PATENT DOCUMENTS

| JP | 2016055370 A | 4/2016 |
|----|--------------|--------|
| JP | 2016144853 A | 8/2016 |
| JP | 2018034214 A | 3/2018 |

*Primary Examiner* — Erica E Cadugan
*Assistant Examiner* — Yasir A Diab
(74) *Attorney, Agent, or Firm* — Cantor Colburn LLP

(57) ABSTRACT

A machine tool includes: a turret configured to hold a tool through a clamp mechanism; a workpiece main spindle device configured to rotatably hold a workpiece; a switching unit configured to change a clamp state of the clamp mechanism by using rotation torque of the workpiece main spindle device; and an in-machine robot configured to move the switching unit. The clamp mechanism includes a torque input hole to which rotation torque is applied to change the clamp state. The switching unit includes an input shaft coupled with the workpiece main spindle device, an output shaft coupled with the torque input hole of the clamp mechanism and configured to output torque to the torque input hole, and a transmission mechanism configured to transfer, to the output shaft, the rotation torque of the workpiece main spindle device input through the input shaft.

5 Claims, 4 Drawing Sheets

(51) Int. Cl.
*B23Q 3/157* (2006.01)
*B23B 31/42* (2006.01)
*B23B 3/22* (2006.01)
*B23Q 7/04* (2006.01)
*B23B 29/24* (2006.01)
*B23B 31/40* (2006.01)
*B23B 29/20* (2006.01)
*B23B 3/16* (2006.01)
*B25J 15/04* (2006.01)
*B25J 15/00* (2006.01)

(52) U.S. Cl.
CPC ............. *B23Q 2003/155411* (2016.11); *B25J 15/0057* (2013.01); *Y10T 29/5114* (2015.01); *Y10T 483/1705* (2015.01); *Y10T 483/1719* (2015.01)

(56) References Cited

U.S. PATENT DOCUMENTS

| | | | | |
|---|---|---|---|---|
| 4,601,094 A * | 7/1986 | Myers | ............... | B23B 3/16 483/24 |
| 4,608,747 A * | 9/1986 | Link | ............... | B23B 3/06 408/13 |
| 4,838,135 A * | 6/1989 | Hevoyan | ............... | B23Q 7/04 82/124 |
| 5,254,068 A * | 10/1993 | Yamada | ............... | G05B 19/40937 29/27 R |
| 5,395,297 A * | 3/1995 | Takada | ............... | B23Q 3/15526 483/25 |
| 6,644,637 B1 * | 11/2003 | Shen | ............... | B25B 5/061 269/152 |
| 7,266,871 B2 * | 9/2007 | Takeuchi | ............... | B23B 3/065 29/27 C |
| 7,578,036 B2 * | 8/2009 | Grossmann | ............... | B23Q 1/5462 29/27 C |
| 10,307,877 B2 * | 6/2019 | Morimura | ............... | B23K 26/0093 |
| 2007/0044290 A1 * | 3/2007 | Grossmann | ............... | B23Q 1/5462 29/36 |
| 2007/0068350 A1 * | 3/2007 | Kawasumi | ............... | B23B 3/167 82/121 |
| 2016/0067840 A1 | 3/2016 | Fujimoto et al. | | |
| 2016/0229012 A1 | 8/2016 | Fujimoto et al. | | |
| 2017/0326700 A1 * | 11/2017 | Morimura | ............... | B23K 26/0093 |
| 2018/0056503 A1 * | 3/2018 | Morimura | ............... | B23Q 7/04 |

* cited by examiner

MACHINE TOOL

CROSS REFERENCE TO RELATED APPLICATION

The present application claims priority under 35 U.S.C. § 119 to Japanese Patent Application No. 2018-012003 filed on Jan. 26, 2018, the entirety of which is hereby incorporated by reference herein and forms a part of the specification.

TECHNICAL FIELD

The present specification discloses a machine tool including a first holding device configured to hold an object through a clamp mechanism, and capable of automatically changing the clamp state of the clamp mechanism.

BACKGROUND ART

Automation has been requested for a machine tool to further improve the efficiency thereof. The machine tool is provided with a holding device configured to hold an object through a general-purpose clamp mechanism. Automatic replacement of an object held by such a holding device has been requested for further automation of the machine tool.

For example, at a turret lathe (turning center), a tool is held through a tool holder including a built-in general-purpose clamp mechanism. Automatic replacement of a tool attached to such a holder has been requested for further automation of the machine tool.

A large number of general-purpose clamp mechanisms are based on an assumption that the clamp state thereof is manually changed by a worker. For example, in a case of a tool holder including a built-in general-purpose clamp mechanism, a worker inserts a hexagonal wrench into a predetermined hexagonal hole provided to the tool holder and rotates the hexagonal wrench to switch between clamping and unclamping of a tool. However, as described above, it has been desired to automatically change the clamp state of such a clamp mechanism to further improve the efficiency of the machine tool.

In some disclosed technologies, the clamp state of a clamp mechanism is automatically changed, and accordingly, a tool is automatically replaced. For example, in a technology disclosed in JP 2016-144853 A, a tool rotation power source included in a turret is used to change the clamp state of a clamp mechanism of a tool holder coupled with the turret. According to the technology, the clamp state of the clamp mechanism can be automatically changed. However, in the technology of JP 2016-144853 A, it is necessary to use a tool holder (clamp mechanism) having a special structure that allows coupling with a tool rotation motor, and a manually operable general-purpose tool holder cannot be used.

In a technology disclosed in JP 2016-55370 A, a multi-joint arm robot is provided in a fabrication chamber of a machine tool, and a tool is replaced by the multi joint arm robot. The multi joint arm robot includes a plurality of click units each configured to grasp a tool at a leading end, and the tool can be coupled and decoupled by moving the multi-joint arm robot while the tool is grasped by the click units. However, JP 2016-55370 A discloses a technology of moving a tool to couple and decouple the tool, but has no description on how to change the clamp state of a clamp mechanism configured to hold the tool. Thus, the technology of JP 2016-55370 A cannot automatically change the clamp state of a manually operable general-purpose tool holder.

The present specification discloses a machine tool capable of automatically changing the clamp state of a manually operable general-purpose clamp mechanism.

SUMMARY

A machine tool disclosed in the present specification includes: a first holding device configured to hold an object through a clamp mechanism; a second holding device configured to rotatably hold a tool or a workpiece; a switching unit configured to change a clamp state of the clamp mechanism by using rotation torque of the second holding device; and a movement device configured to move the switching unit. The clamp mechanism includes a torque input part to which rotation torque is applied to change the clamp state. The switching unit includes an input member coupled with the second holding device and rotated by the second holding device, an output member coupled with the torque input part of the clamp mechanism and configured to output torque to the torque input part while the input member is coupled with the second holding device, and a transmission mechanism configured to transfer, to the output member, the rotation torque of the second holding device input through the input member.

With this configuration, the clamp state of a general-purpose clamp mechanism for manual operation can be automatically changed.

The switching unit may further include an insertion-removal mechanism configured to remove the object from the clamp mechanism or insert the object into the clamp mechanism while the output member is connected with the torque input part.

With this configuration, the object can be automatically replaced.

In this case, the switching unit may include the two or more insertion-removal mechanisms, and the object held by the clamp mechanism may be replaceable without moving the switching unit.

With this configuration, it is possible to remove an object to be replaced and insert a new object while maintaining the coupling between the output member and the torque input part, thereby allowing more efficient replacement of the object.

The switching unit may include a torque limiter configured to limit rotation torque output from the output member. Alternatively, the machine tool may further include a controller configured to perform torque limitation control of the second holding device so that rotation torque output from the output member is equal to or smaller than an upper limit value.

This configuration prevents inputting of excessive torque to the clamp mechanism.

The object may be a tool, the first holding device may be a turret configured to hold the tool through a holder including the clamp mechanism, and the second holding device may be any of a workpiece main spindle device, a tailstock, a tool main spindle device, and another turret that are configured to hold a workpiece.

With this configuration, the clamp state of a general-purpose holder can be automatically changed.

With the machine tool disclosed in the present specification, the clamp state of a general-purpose clamp mechanism for manual operation can be automatically changed.

BRIEF DESCRIPTION OF DRAWINGS

Embodiment(s) of the present disclosure will be described by reference to the following figures, wherein.

DESCRIPTION OF EMBODIMENTS

Figure 1:
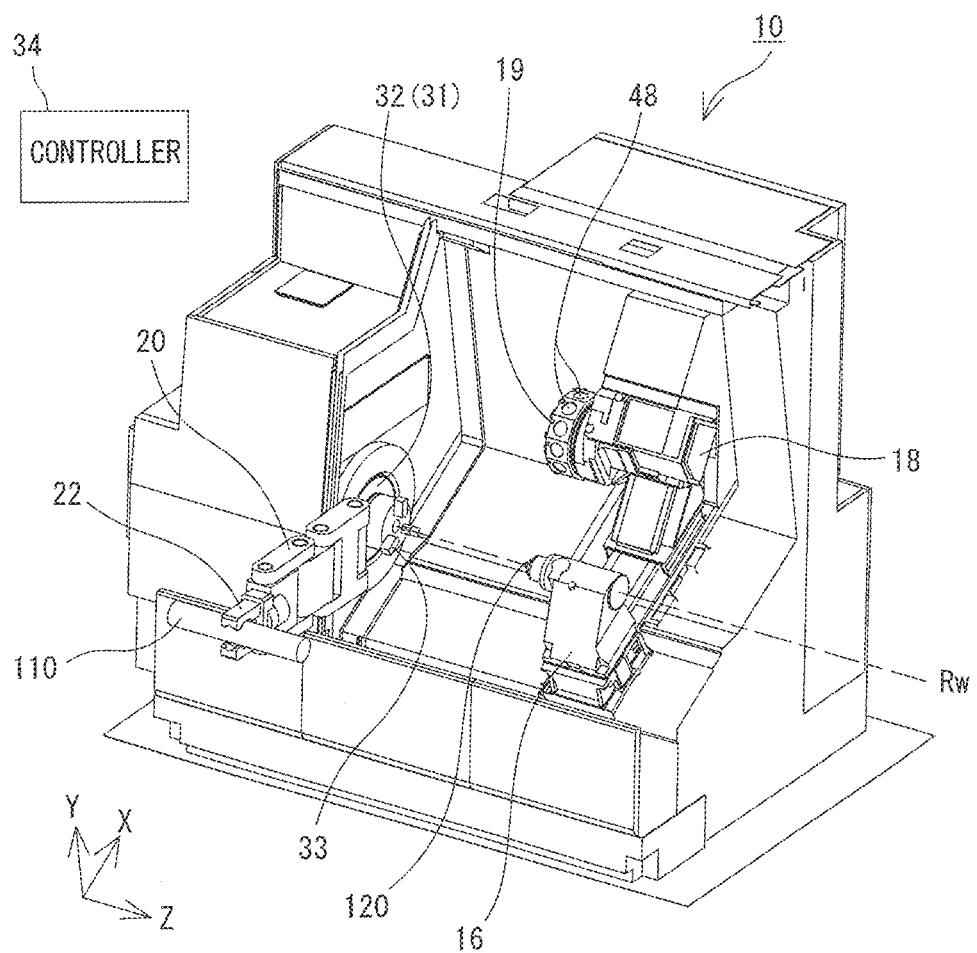
FIG. 1 is a diagram illustrating the configuration of a machine tool.

The following describes the configuration of a machine tool 10 with reference to the accompanying drawings. FIG. 1 is a diagram illustrating the configuration of the machine tool 10. In the following description, a direction parallel to a rotational axis Rw of a workpiece main spindle 32 is referred to as a Z axis, a direction parallel to the moving direction of a tool post 18 orthogonal to the Z axis is referred to as an X axis, and a direction orthogonal to the X axis and the Z axis is referred to as a Y axis.

The machine tool 10 fabricates a workpiece 110 held by the workpiece main spindle 32 with a tool 100 held by the tool post 18. More specifically, the machine tool 10 is a turning center that is NC controlled and includes a turret 19 configured to hold a plurality of tools 100. A fabrication chamber of the machine tool 10 is covered by a cover. A large opening is formed at a front surface of the fabrication chamber, and opened and closed by a door (not illustrated in FIG. 1). An operator accesses each component in the fabrication chamber through the opening. The door provided to the opening is closed during fabrication. This assures, for example, safety and environmental conditions.

The machine tool 10 includes a workpiece main spindle device 31 configured to hold one end of the workpiece 110 in a spinnable manner, the tool post 18 configured to hold the tools 100, and a tailstock 16 configured to support the other end of the workpiece 110. The workpiece main spindle device 31 functions as a second holding device configured to rotatably hold the workpiece 110, and includes a head stock (hidden by other members) including a built-in drive motor or the like, and the workpiece main spindle 32 attached to the head stock. The workpiece main spindle 32 includes a chuck 33 or collet configured to hold the workpiece 110 in a detachable manner so that the workpiece 110 can be replaced as appropriate. The workpiece main spindle 32 and the chuck 33 spin about the work rotational axis Rw extending in the horizontal direction (the Z-axis direction in FIG. 1).

The tailstock 16 is disposed facing the workpiece main spindle 32 in the Z-axis direction and supports the other end of the workpiece 110 held by the workpiece main spindle 32. The tailstock 16 is installed at such a position that the central axis thereof aligns with the work rotational axis Rw. A tailstock center 120 having a leading end sharpened in a circular cone shape is attached to the tailstock 16, and during fabrication, the leading end of the tailstock center 120 is in contact with the central point of the workpiece 110. The tailstock 16 is movable to or away from the workpiece 110 in the Z-axis direction.

The tool post 18 holds the tools 100. The held tools 100 may be a lathe turning tool or a rotating tool (such as an end mill). The tool post 18 is movable in a direction parallel to the Z axis; in other words, the axis of the workpiece 110. The tool post 18 is placed on a guide rail extending in a direction parallel to the X axis; in other words, the radial direction of the workpiece 110, and is movable in the direction parallel to the X axis. As illustrated in FIG. 1, the X axis is tilted relative to the horizontal direction, extending upward on the back side when viewed from the opening of the fabrication chamber.

The turret 19 capable of holding a plurality of tools 100 is provided at an end part of the tool post 18. The turret 19 functions as a first holding device configured to hold each tool 100 as an object through a clamp mechanism 51 built in a tool holder 50 (refer to FIG. 2) to be described later. The turret 19 is substantially cylindrical and rotatable about an axis parallel to the Z axis. A plurality of spigot holes 48 for attaching the tool holders 50 are formed on the peripheral surface of the turret 19. Each tool holder 50 is partially inserted into the corresponding spigot hole 48, and fastened to the turret 19 by a bolt. The clamp mechanism 51 configured to clamp or unclamp a tool 100 is provided inside each tool holder 50. The clamp mechanism 51 is a general-purpose clamp mechanism, the clamp state of which is manually changed as described later. Through the clamp mechanism 51, the tool 100 (more precisely, a tool adapter 102 holding the tool) is detachably held by the tool holder 50. In the present example, each clamp mechanism 51 is automatically switched between clamping and unclamping by the machine tool 10, as will be described later.

In any case, the turret 19 holds a plurality of tools 100 through the tool holders 50. The turret 19 is rotated to appropriately change a tool 100 used to fabricate the workpiece 110. When the tool post 18 is moved in the direction parallel to the Z axis, the tools 100 held by the turret 19 are moved in the direction parallel to the Z axis. When the tool post 18 is moved in the direction parallel to the X axis, the tools 100 held by the turret 19 is moved in the direction parallel to the X axis. For example, the amount of cut of the workpiece 110 by each tool 100 can be changed by moving the tool post 18 in the direction parallel to the X axis.

In addition, an in-machine robot 20 is provided in the fabrication chamber. The in-machine robot 20 functions as a movement device configured to move a switching unit 60 (refer to FIG. 3) to be described later. In the present example, the in-machine robot 20 is a multi joint arm robot including a replaceable end effector at a leading end. In FIG. 1, a hand mechanism 22 is attached as the end effector. When the clamp state of the clamp mechanism 51 is to be changed, the switching unit 60 to be described later is attached to the leading end of the in-machine robot 20.

The installation position and configuration of the in-machine robot 20 are not particularly limited so long as the robot can move the switching unit 60 to a desired position. Thus, the in-machine robot 20 is not limited to the multi joint arm robot but may be, for example, a robot including a gantry rail or a parallel link. In addition, another movement device capable of moving the switching unit 60, such as a conveyance mechanism combined with a linear movement mechanism or the like, may be provided in place of the in-machine robot 20.

A controller 34 controls drive of each component of the machine tool 10 in accordance with an instruction from the operator. The controller 34 includes, for example, a CPU configured to perform various kinds of computation, and a memory configured to store various kinds of control programs and control parameters. The controller 34 has a communication function, and can perform communication of various kinds of data such as NC program data or the like with another device. The controller 34 may include a numerical value controller configured to compute, for example, the positions of each tool 100 and the workpiece 110 as needed. The controller 34 may be a single device or a combination of a plurality of arithmetic devices.

Figure 2:
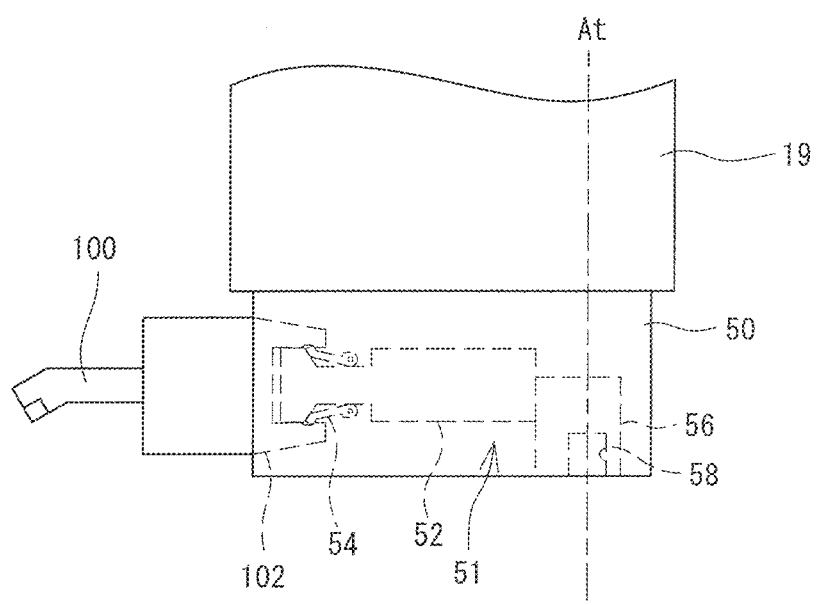
FIG. 2 is a diagram illustrating the configuration of a tool holder.

The following describes each tool holder 50 including the clamp mechanism 51 with reference to FIG. 2. The tool holder 50 is configured to hold a tool 100 as described above, and includes the built-in clamp mechanism 51 for manual operation. The clamp mechanism 51 may have various configurations, but in the example illustrated in FIG. 2, the clamp mechanism 51 includes a draw bar 52 pressed in one direction by a spring (not illustrated), and a clamp click 54 configured to swing in accordance with movement of the draw bar 52. The draw bar 52 has a taper surface that contacts part of the clamp click 54. The taper surface presses or releases the clamp click 54 as the draw bar 52 moves so that the clamp click 54 swings in the radial direction. The swing of the clamp click 54 in the radial direction results in engagement or disengagement between the clamp click 54 and the tool adapter 102, and thus in switchover between the clamping and unclamping of the clamp mechanism 51.

The tool adapter 102 is configured to hold a tool 100, and has a base end inserted into a tool insertion hole (not illustrated) provided in the tool holder 50. The base end of the tool adapter 102 has a shape according to various standards, and is provided with a groove or protrusion to be engaged with the clamp click 54. When the clamp click 54 engages with the groove or protrusion of the tool adapter 102, the tool 100 is clamped to the tool holder 50. When the groove or protrusion of the tool adapter 102 and the clamp click 54 are disengaged, the tool 100 (tool adapter 102) is unclamped to allow insertion and removal.

The tool holder 50 is also provided with a rotational body 56. The rotational body 56 includes a torque input hole 58 accessible from the outside. The torque input hole 58 is a hexagonal hole to which a hexagonal wrench can be inserted. The rotational body 56 is rotated about an axis At of the torque input hole 58 by rotating the hexagonal wrench inserted to the torque input hole 58. The rotation of the rotational body 56 is transferred as a straight motion to the draw bar 52 directly or through a transmission mechanism such as a cam or a screw. Accordingly, the draw bar 52 is moved to change the clamp state of the clamp mechanism 51.

Conventionally, such clamp state change; in other words, rotation of the rotational body 56 by using a hexagonal wrench, has been manually performed. However, in this case, an operator needs to perform the work at each tool replacement, which has been preventing improvement of the efficiency of the machine tool 10 and automation thereof. Some disclosed automatic clamp mechanisms automatically change the clamp state by using a motor or a hydraulic pressure mechanism. When such an automatic clamp mechanism is used, tool replacement can be automatically performed. However, a tool holder including the automatic clamp mechanism is expensive and thus lacks versatility, which has been another problem.

In the present specification, the switching unit 60 configured to change the clamp state of each clamp mechanism 51 is attached to the leading end of the in-machine robot 20 to perform automatic changeover of the clamp state of the clamp mechanism 51. This will be described below with reference to FIG. 3 and FIG. 4.

Figure 3:
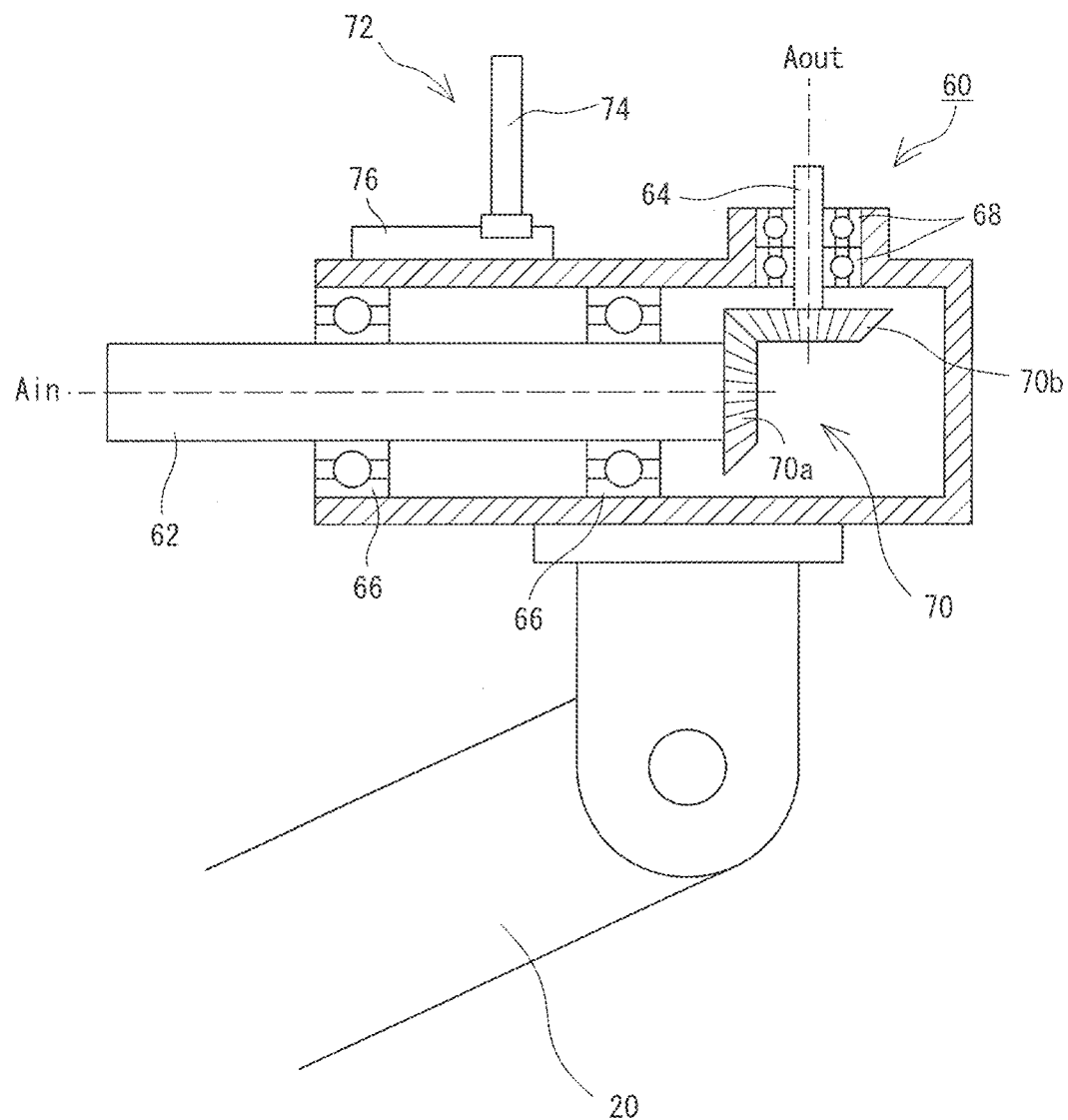
FIG. 3 is a diagram illustrating the configuration of a switching unit.

FIG. 3 is a diagram illustrating the configuration of the switching unit 60. The switching unit 60 includes an input shaft 62, an output shaft 64, a transmission mechanism 70 configured to transfer motion of the input shaft 62 to the output shaft 64, and an insertion-removal mechanism 72 configured to insert and remove a tool 100. The input shaft 62 is a shaft member having one end externally protruding, and is pivotally supported in a rotatable manner by a bearing 66. The one end of the input shaft 62 can be coupled with the workpiece main spindle device 31 (second holding device); in other words, can be grasped by the chuck 33. Since the input shaft 62 is coupled with the workpiece main spindle device 31, the input shaft 62 can be rotated by the workpiece main spindle device 31.

The output shaft 64 is a shaft member extending in a direction intersecting the input shaft 62 substantially at 90°, and has one end externally protruding. The output shaft 64 is a shaft member coupled with the torque input hole 58 of the tool holder 50 and having a shape corresponding to that of the torque input hole 58; in other words, a hexagonal section. The output shaft 64 is pivotally supported by a bearing 68 in a rotatable manner.

The transmission mechanism 70 may have various kinds of configurations, but in the present example, the transmission mechanism 70 includes a pair of bevel gears 70a and 70b provided at the other end of the input shaft 62 and the other end of the output shaft 64 and meshed with each other. The rotational motion of the input shaft 62 is subjected to angle conversion by 90° through the pair of bevel gears 70a and 70b, and transferred to the output shaft 64. The above-described configuration of the transmission mechanism 70 is merely exemplary, and the transmission mechanism 70 may have another configuration with which the motion of the input shaft 62 can be converted into a desired form and transferred to the output shaft 64.

The insertion-removal mechanism 72 is a mechanism configured to remove a tool 100 (including the tool adapter 102) from the tool holder 50 in the unclamped state or to insert the tool 100 into the tool holder 50. The insertion-removal mechanism 72 may have various configurations, but the insertion-removal mechanism 72 in the present example includes a gripper 74 configured to grasp the tool adapter 102, and a guided air cylinder 76 configured to move the gripper 74. In this case, when the tool 100 is to be removed from the tool holder 50, the gripper 74 is moved in a direction departing from the tool holder 50 while the tool adapter 102 is grasped by the gripper 74. When the tool 100 is to be inserted into the tool holder 50, the gripper 74 is moved in a direction approaching the tool holder 50 while the tool adapter 102 is grasped by the gripper 74.

Figure 4:
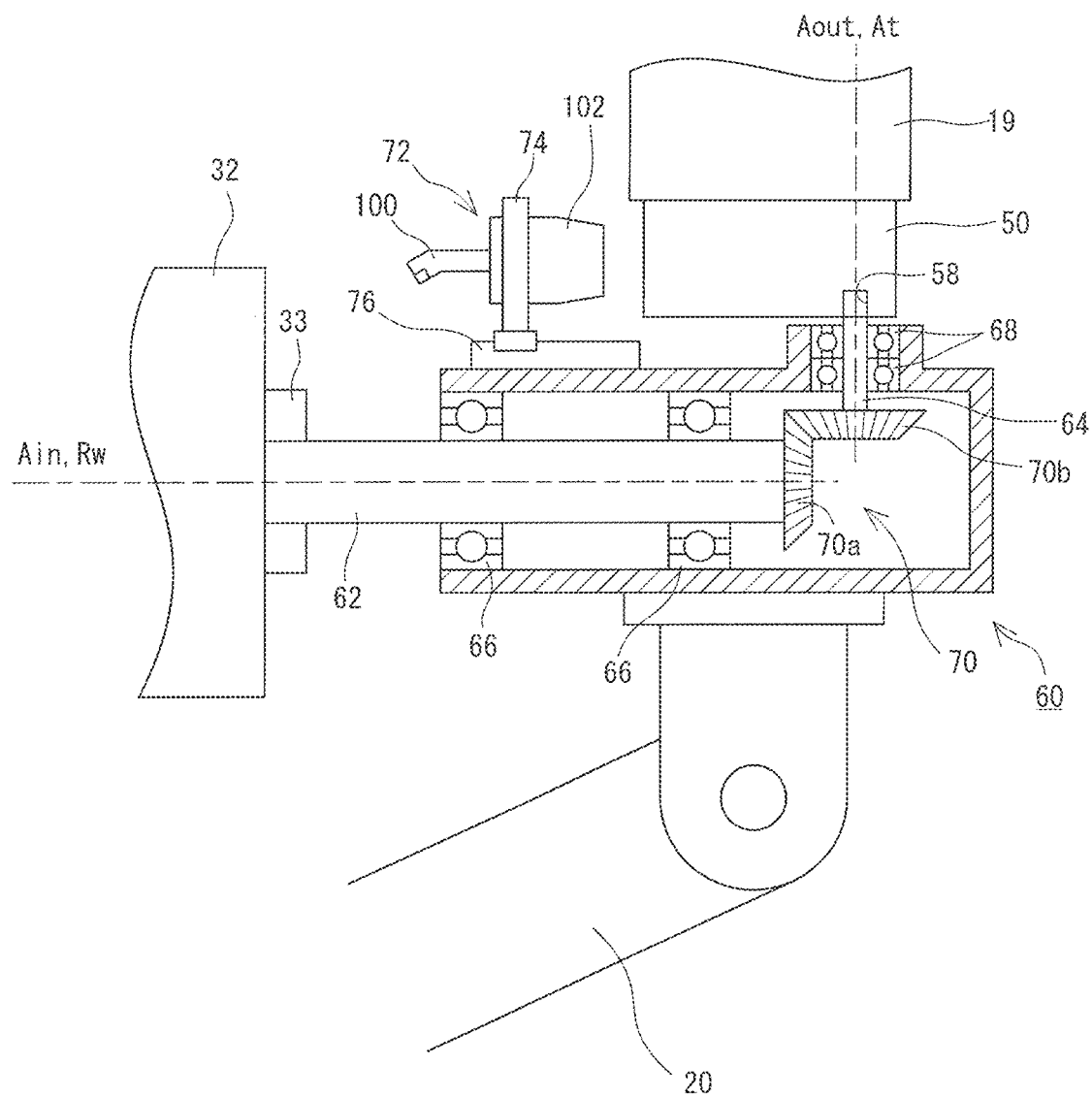
FIG. 4 is a diagram illustrating a tool replacement situation.

The following describes the process of tool replacement by using the switching unit 60 with reference to FIG. 4. FIG. 4 is a diagram illustrating a situation of the tool replacement by using the switching unit 60. When the tool replacement is performed, the controller 34 first drives the in-machine robot 20 to couple the input shaft 62 of the switching unit 60 with the workpiece main spindle device 31. Specifically, the controller 34 conveys the input shaft 62 to the vicinity of the chuck 33, and then drives the chuck 33 to hold the input shaft 62. In this case, the controller 34 drives the in-machine robot 20 to adjust the posture of the switching unit 60 so that an axis Ain of the input shaft 62 aligns with the work rotational axis Rw, and an axis Aout of the output shaft 64 becomes parallel to the X axis. Once the input shaft 62 is coupled with the workpiece main spindle device 31, the controller 34 subsequently couples the output shaft 64 to a torque input hole 58. Specifically, first, the controller 34 rotates the turret 19 so that the axis At of the torque input hole 58 corresponding to a replacement target tool 100 becomes parallel to the X axis; in other words, parallel to the axis Aout of the output shaft 64. Subsequently, the controller 34 moves the tool post 18 in the Z direction to a position where the axis At of the torque input hole 58 and the axis Aout of the output shaft 64 are arranged in a line in the X direction. Once the torque input hole 58 and the output shaft 64 are arranged in a line in the X direction, the controller 34 subsequently moves the tool post 18 in the X direction to insert the output shaft 64 into the torque input hole 58.

In the present example, since the output shaft 64 has a hexagonal section and the torque input hole 58 is a hexagonal hole, the output shaft 64 cannot be inserted into the torque input hole 58 when the rotational phases of the output shaft 64 and the torque input hole 58 do not match with each other. Thus, before inserting the output shaft 64 into the torque input hole 58, the controller 34 rotates the output shaft 64 as necessary to match the phase of the output shaft 64 with the phase of the torque input hole 58. Specifically, the controller 34 drives the workpiece main spindle device 31 to rotate the input shaft 62. The rotation of the input shaft 62 is transferred to the output shaft 64 through the bevel gears 70a and 70b to rotate the output shaft 64 so that the phase thereof matches with that of the torque input hole 58. Then, accordingly, the output shaft 64 can be coupled with the torque input hole 58.

Once the input shaft 62 is coupled with the workpiece main spindle device 31 and the output shaft 64 is coupled with the torque input hole 58, the controller 34 subsequently drives the workpiece main spindle device 31 to rotate the input shaft 62 in a predetermined direction. The rotation of the input shaft 62 is transferred to the output shaft 64 through the bevel gears 70a and 70b as described above, and accordingly, the output shaft 64 rotates. When the output shaft 64 rotates, the rotation torque is transferred to the rotational body 56 through the torque input hole 58. In other words, the rotational body 56 rotates similarly to manual operation by using a hexagonal wrench. Accordingly, the draw bar 52 moves to switch the clamp mechanism 51 to the unclamped state.

Typically, a stopper (not illustrated) is provided in the tool holder 50 to regulate the amount of rotation of the rotational body 56. To prevent breakdown of the stopper, the switching unit 60 desirably includes a torque limiter configured to limit output torque from the output shaft 64. Specifically, it is desirable to provide a mechanism configured to neutralize torque output from the output shaft 64 when the rotation of the rotational body 56 is regulated by the stopper and reaction from the rotational body 56 is increased. Alternatively, instead of providing the torque limiter, the workpiece main spindle device 31 may perform torque limiting control. For example, torque output from a motor is typically proportional to current, and thus current applied to a drive motor may be limited so that torque output from the workpiece main spindle device 31 becomes equal to or smaller than a limit value.

In any case, similarly to a case of manual operation, the clamp state of the tool holder 50 can be changed by transferring the rotation of the workpiece main spindle device 31 to the rotational body 56 of the tool holder 50 through the input shaft 62, the transmission mechanism 70, and the output shaft 64.

Once the tool holder 50 is switched to the unclamped state, the controller 34 subsequently drives the insertion-removal mechanism 72 to remove the tool 100 from the tool holder 50. Specifically, the controller 34 drives the guided air cylinder 76 and the gripper 74 to cause the gripper 74 to grasp the tool adapter 102. Then, the controller 34 drives the guided air cylinder 76 to move the gripper 74 grasping the tool adapter 102 in the direction departing from the tool holder 50. As a result, the tool 100 is removed from the tool holder 50 as illustrated in FIG. 4. The amount of the movement of the gripper 74 is typically approximately several mm to several tens of mm, which is sufficient depending on the shape of the tool adapter 102.

Once the tool 100 is removed from the tool holder 50, the controller 34 subsequently moves the tool post 18 to uncoupling the torque input hole 58 from the output shaft 64, and further releases the chuck 33 to uncoupling the input shaft 62 from the workpiece main spindle device 31. Thereafter, the controller 34 drives the in-machine robot 20 to convey the tool 100 grasped by the gripper 74 to a predetermined tool housing unit (not illustrated). The tool housing unit may be provided within or outside of the fabrication chamber.

Once the removal of the tool 100 is completed, the controller 34 subsequently starts mounting a new tool 100. Specifically, the controller 34 drives the in-machine robot 20 and the gripper 74 to cause the gripper 74 to grasp the new tool 100. Then, the controller 34 couples the input shaft 62 with the workpiece main spindle device 31 and couples the output shaft 64 with the torque input hole 58 through the above-described procedure. Then, while keeping this state, the controller 34 drives the guided air cylinder 76 to insert the tool 100 grasped by the gripper 74 into the tool insertion hole of the tool holder 50.

In this state, the controller 34 drives the workpiece main spindle device 31 to rotate the input shaft 62 in a direction in which clamping is performed. The rotation of the input shaft 62 is transferred to the rotational body 56 through the transmission mechanism 70 and the output shaft 64 to switch the clamp mechanism 51 of the tool holder to the clamped state. In the clamped state, the controller 34 releases the gripper 74 to set free the tool adapter 102. Then, the controller 34 uncouples the output shaft 64 from the torque input hole 58 and uncouples the input shaft 62 from the workpiece main spindle device 31, sequentially. Lastly, the controller 34 drives the in-machine robot 20 to retract the switching unit 60 to a predetermined retracted position, which ends the tool replacement.

As understood from the above description, in the present example, the clamp state of the clamp mechanism 51 can be automatically changed by rotating the output shaft 64, which can be coupled to the torque input hole 58. In other words, it is possible to automatically change the state of the clamp mechanism 51 by using the inexpensive and general-purpose tool holder 50 including the built-in clamp mechanism 51, and hence perform tool replacement. As a result, the efficiency of the machine tool 10 is further improved.

In the present example, torque output from the workpiece main spindle device 31 is used as torque necessary for changing the state of the clamp mechanism 51. This eliminates the need to provide a dedicated drive source to change the state of the clamp mechanism 51, which leads to downsizing of the switching unit 60. With a downsized switching unit 60, only small output is needed from the in-machine robot 20 for moving the switching unit 60, which leads to downsizing and cost reduction of the in-machine robot 20.

The configuration described above is merely exemplary and may be altered as appropriate to another configuration including the switching unit 60 including at least: the output shaft 64 that can be coupled to the torque input hole 58 of the clamp mechanism 51 attached to the first holding device; the input shaft 62 that can be coupled with the second holding device; and the transmission mechanism 70 capable of transferring the motion of the input shaft 62 to the output shaft 64. For example, the switching unit 60 includes the single insertion-removal mechanism 72 in the above description, but the single switching unit 60 may include a plurality of insertion-removal mechanisms 72. With this configuration, it is possible to replace an object (in the above-described example, a tool 100) held by the first holding device without doubly reciprocating the switching unit 60.

In the above description, the state of the clamp mechanism 51 is changed by using the rotation torque of the workpiece main spindle device 31, but the used torque may be output torque from another device. For example, some multi-tasking machines such as the machine tool 10 include a rotating fabrication tool main spindle device in addition to the tool post 18 and the turret 19. In such a multi-tasking machine, the clamp state of the clamp mechanism 51 may be changed by using the rotation torque of the tool main spindle device. Specifically, the input shaft 62 of the switching unit 60 may be held by (coupled with) the tool main spindle device in place of a rotating tool, and in this case, the tool main spindle device functions as the second holding device. In another configuration, some machine tools 10 includes two or more turrets, and an opposite main spindle device provided facing the workpiece main spindle device 31. In such a machine tool, the state of the clamp mechanism 51 may be changed by using the rotation torque of each turret and the rotation torque of the opposite main spindle device. In other words, the input shaft 62 of the switching unit 60 may be coupled with the turret and the opposite main spindle.

Although the above description is made on the example of changing the clamp state of the clamp mechanism 51 attached to the turret 19, the technology disclosed in the present specification is also applicable to changing of the state of another manually operable clamp mechanism 51. For example, the tailstock 16 holds the tailstock center through a manually operable clamp mechanism. The technology disclosed in the present specification is also applicable to changeover of the clamp state of the clamp mechanism of the tailstock 16. Specifically, in this case, the tailstock 16 functions as the first holding device. At a machining center, the workpiece 110 is clamped by a plurality of jigs (clamp mechanisms) while being placed on a work table. Typically, the clamp state of each jig is changed through manual operation by using, for example, a hexagonal wrench. The switching unit 60 disclosed in the present specification may be used to change the clamp state of each jig (clamp mechanism) configured to hold a workpiece. Specifically, in this case, the work table functions as the first holding device.

REFERENCE SIGNS LIST

10 machine tool, 16 tailstock, 18 tool post, 19 turret, 20 in-machine robot, 22 hand mechanism, 32 workpiece main spindle, 33 chuck, 34 controller, 48 spigot hole, 50 tool holder, 51 clamp mechanism, 52 draw bar, 54 clamp click, 56 rotational body, 58 torque input hole, 60 switching unit, 62 input shaft, 64 output shaft, 66, 68 bearing, 70 transmission mechanism, 72 insertion-removal mechanism, 74 gripper, 76 guided air cylinder, 100 tool, 102 tool adapter, 110 workpiece, 120 tailstock center.

The invention claimed is:

1. A machine tool comprising:
a first holding device configured to hold an object through a clamp mechanism;
a second holding device configured to rotatably hold a workpiece;
a switching unit configured to change a clamp state of the clamp mechanism by using rotation torque of the second holding device; and
a movement device configured to move the switching unit, wherein
the clamp mechanism includes a torque input part to which rotation torque is applied to change the clamp state,
the switching unit includes
an input member coupled with the second holding device and rotated by the second holding device,
an output member coupled with the torque input part of the clamp mechanism and configured to output torque to the torque input part while the input member is coupled with the second holding device, and
a transmission mechanism configured to transfer, to the output member, the rotation torque of the second holding device input through the input member,
the object is a tool, and
the first holding device is a turret configured to hold the tool through a holder including the clamp mechanism.

2. The machine tool according to claim 1, wherein the switching unit further includes an insertion-removal mechanism configured to remove the object from the clamp mechanism while the output member is connected with the torque input part or insert the object into the clamp mechanism while the output member is connected with the torque input part.

3. The machine tool according to claim 2, wherein
the switching unit includes two or more insertion-removal mechanisms, and
the object held by the clamp mechanism is replaceable without moving the switching unit.

4. The machine tool according to claim 1, wherein the switching unit includes a torque limiter configured to limit rotation torque output from the output member.

5. The machine tool according to claim 1, further comprising a controller configured to perform torque limitation control of the second holding device so that rotation torque output from the output member is equal to or smaller than an upper limit value.

* * * * *